UNITED STATES PATENT OFFICE.

OTTO BOYSEN, OF BUFFALO, NEW YORK.

SUBSTITUTE FOR BUTTER.

SPECIFICATION forming part of Letters Patent No. 236,483, dated January 11, 1881.

Application filed October 18, 1880. (No specimens.)

*To all whom it may concern:*

Be it known that I, OTTO BOYSEN, M. D., of Buffalo, in the county of Erie and State of New York, have invented certain new and useful Improvements in Substitutes for Butter; and I do hereby declare that the following description of my said invention forms a full, clear, and exact specification, which will enable others skilled in the art to which it appertains to make and use the same.

This invention consists in an improved article adapted to be used as a substitute for dairy butter, and in the improved process of manufacturing the same, which consists in the successive steps hereinafter set forth.

I first separate the oleine and margarine from the stearine by any known method—for example, by mincing and melting the fat, and then pressing it in bags of open texture. I next place the oleomargarine thus obtained with an alkaline solution, preferably in the following proportions: to eighty pounds of oleomargarine twenty pounds of water and eight ounces of bicarbonate of soda. I next agitate the oleomargarine and the alkaline solution together until the oil-globules of the former are thoroughly mixed with the alkaline solution and partly saponified by the action of said alkali. I then add to the oleomargarine thus partly saponified a small quantity of butyric acid, preferably in the proportion of one dram to every hundred pounds. This gives to the article such a fine flavor that even an expert can scarcely distinguish it from excellent dairy butter. Of course the proportion of butyric acid thus added may be varied to suit the requirements of each particular article or the tastes of certain classes of purchasers.

This process, as above described, avoids the use of milk, and consequently the presence of caseine. When this latter element is present in any considerable quantities a lactic fermentation often occurs, continuing until the caseine is all converted into butyric acid. Now, a large amount of said acid will make the compound rancid, although a small amount will flavor without injuring it; hence, by dispensing with caseine and substituting therefor a slight flavor of butyric acid, I have greatly improved the article produced.

Having thus described my invention, what I claim as new, and desire to secure by Letters Patent, is—

1. The process of making a substitute for butter, consisting in adding to oleomargarine an alkaline solution, and agitating the mixture until partial saponification ensues, and then adding a minute quantity of butyric acid, substantially as set forth.

2. As an improved article of manufacture, a substitute for butter, consisting of oleomargarine with the addition of a minute quantity of butyric acid, substantially as set forth.

In testimony that I claim the foregoing as my invention I have hereto set my hand in the presence of two subscribing witnesses.

O. BOYSEN, M. D.

Attest:
MICHAEL J. STARK,
GEO. J. STRAUB.